United States Patent [19]

Gordon

[11] Patent Number: 4,489,797

[45] Date of Patent: Dec. 25, 1984

[54] RESILIENT MOUNTED MULTIPLE LOAD ELEMENT WEIGH SCALE

[75] Inventor: Arnold S. Gordon, Woodmere, N.Y.

[73] Assignee: Circuits & Systems, Inc., East Rockaway, N.Y.

[21] Appl. No.: 464,657

[22] Filed: Feb. 7, 1983

[51] Int. Cl.³ .................... G01G 21/00; G01G 23/06
[52] U.S. Cl. .................................... 177/128; 177/187
[58] Field of Search ................ 177/184, 187, 189, 128

[56] References Cited

U.S. PATENT DOCUMENTS 3,301,341  1/1967  Fathauer ............................ 177/184

Primary Examiner—George H. Miller, Jr.
Attorney, Agent, or Firm—David P. Gordon

[57] ABSTRACT

An improved weighing scale comprises a base support for a plurality of load cells, a resilient load decoupling member for each load cell, and a platform. The resilient load decoupling member allows each load cell to be decoupled from non-vertical forces, but still provides positioning and self-centering means. The load cells provide an output signal indicative of the applied weight on the platform.

20 Claims, 5 Drawing Figures

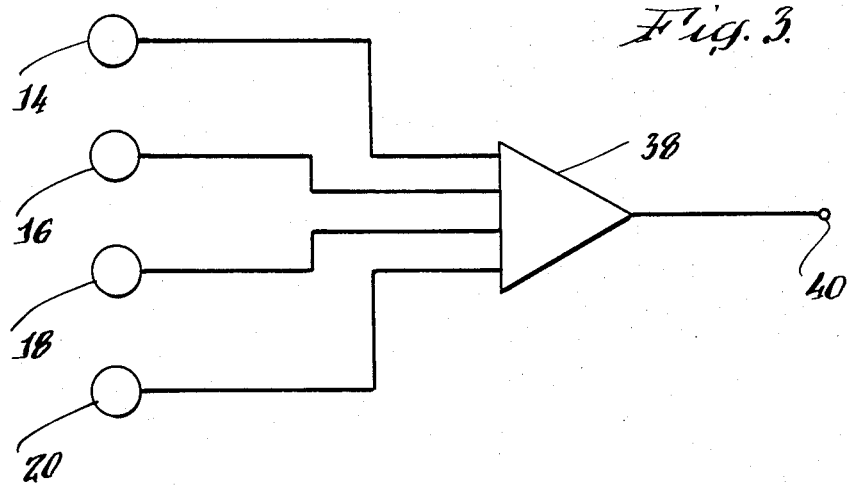
Fig. 3.
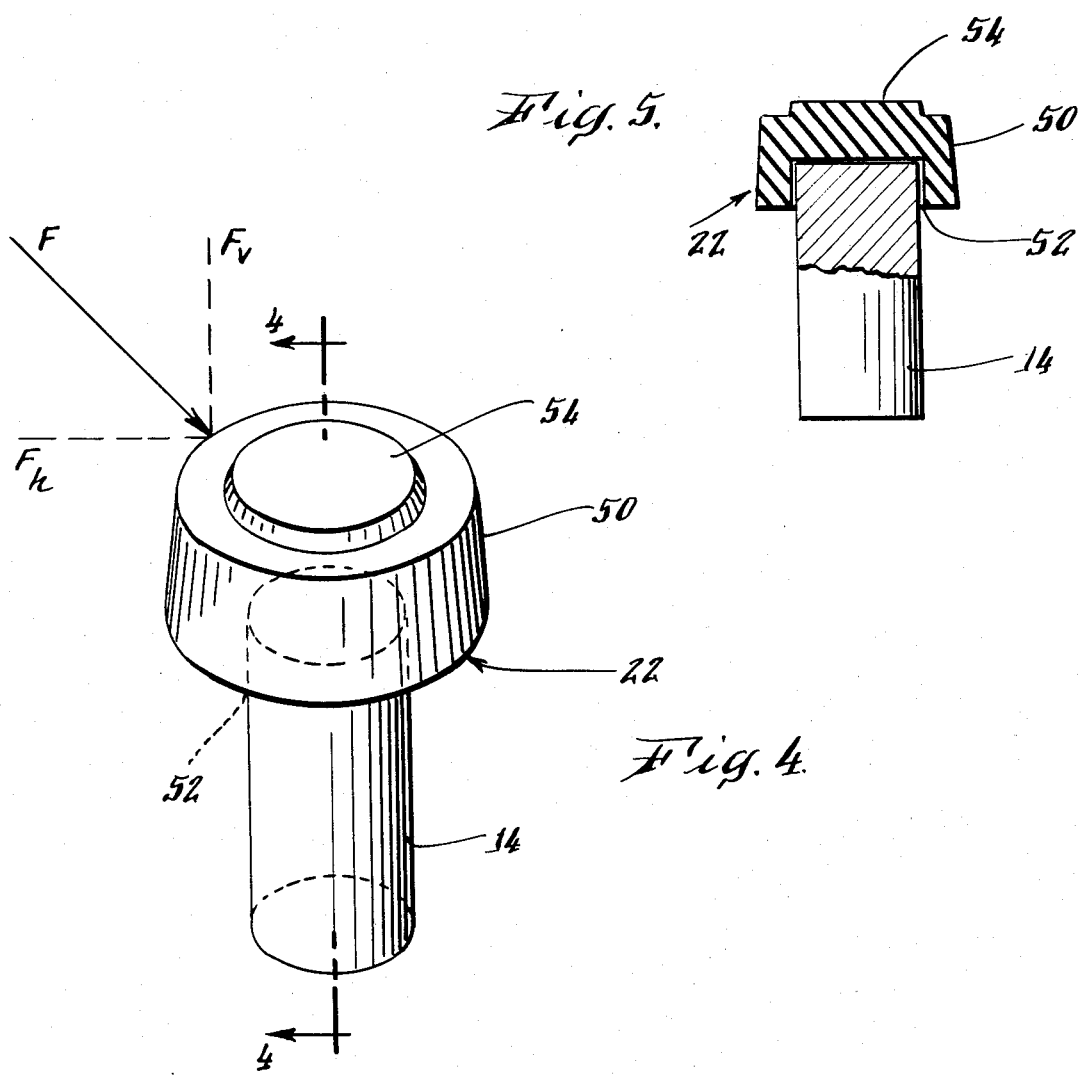
Fig. 5.
Fig. 4.

RESILIENT MOUNTED MULTIPLE LOAD ELEMENT WEIGH SCALE

BACKGROUND OF THE INVENTION

This invention relates generally to weighing scales, and more particularly to multiple load element scales where the load elements are attached to the scale platform.

It is common practice to utilize multiple load cells on a weighing scale. One well-known type of such scale takes the form of four load cells, one at each corner of a rectangular scale, with load cells rigidly attached to a rigid base on one side, and to a rigid platform on the other. A weight placed on the weighing platform is supported by the four load cells. The electrical output from the load cells may be properly summed electrically to provide an output voltage which is proportional to the weight applied on the platform.

Great care must be taken that only vertical forces are measured. Horizontal forces are introduced by many factors including: misalignment between the top platform and bottom base structures; thermal expansion and compression of the load cells, mounting structures, and base and platform structures; and misalignment of the load cells' bearing axis such that the load cells' bearing axis is not aligned in a perfectly perpendicular manner with the platform.

It is common practice to decouple these horizontal forces by means of complex flexures machined into the load cells in combination with single-point pivots, ball bearings and cups, and similar means which will only support vertical forces. As is well appreciated in the art, such means are difficult and expensive to implement.

BRIEF DESCRIPTION OF THE PRESENT INVENTION

With the above considerations in mind, a primary object of the present invention is to provide an improved weighing scale where horizontal forces are easily decoupled from the load cells.

Another object of the invention is to provide a weighing scale having an improved load decoupling member which is resilient and which is capable of decoupling a load cell and a scale platform such that horizontal forces applied to the platform will not be transferred to the load cell.

Yet another object of the invention is to provide an improved load decoupling member having positioning and self-centering means.

An inexpensive, improved load decoupling member is even another object of the invention.

Briefly, the objects of the invention are realized by providing a resilient decoupling member (connection structure) between the top of the load cell and the scale platform. The resilient member circumscribes the top end of the load cell and a protrusion extending from the top of the resilient member is provided to self-center the platform which has a corresponding indentation.

With the foregoing arrangement, when a non-vertical force is applied to the platform, the resilient member will deform and decouple this force from the load cell. If the resilient members are suitably secured between the platform and load cell, the horizontal forces will be decoupled in a manner more easily obtained than by the decoupling performed in the conventional manner. Additionally, the cost of obtaining the decoupling will be greatly lessened.

BRIEF DESCRIPTION OF THE DRAWING

A better understanding of the invention will be had by referring to the accompanying drawings in which;

FIG. 3 is a schematic circuit diagram of the electrical connections for summing the output from multiple load cells.

FIG. 4 is a perspective view of an actual embodiment of a resilient member and load cell constructed in accord with the principles of the invention shown in FIG. 1 and FIG. 2.

FIG. 5 is a cross section taken in the direction of the arrows 4—4 of FIG. 4.

DETAILED DESCRIPTION OF THE PREFERRED EMBODIMENT

Figure 1:
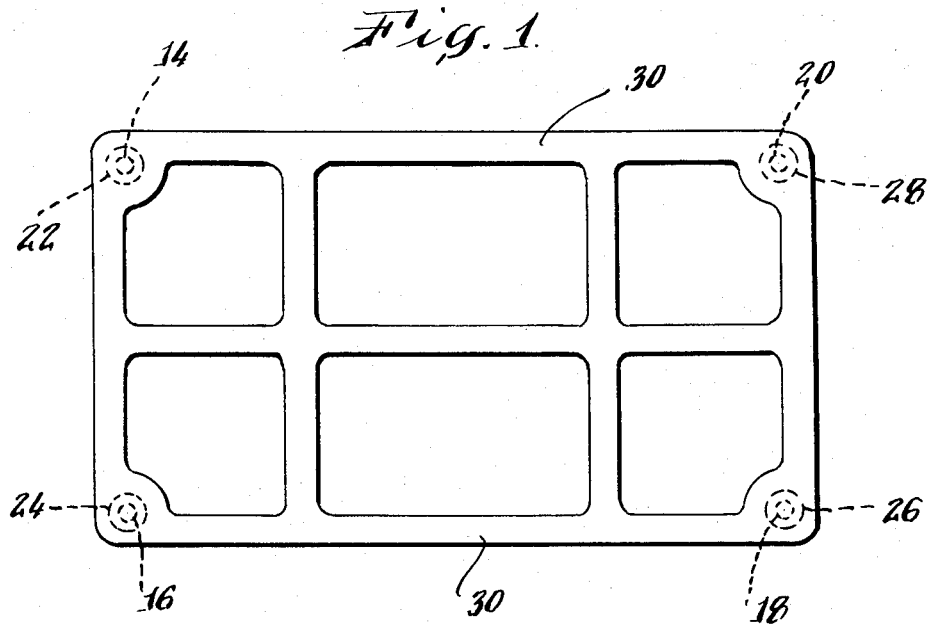
FIG. 1 is a top view of a rectangular weighing scale in accord with the present invention.
Figure 2:
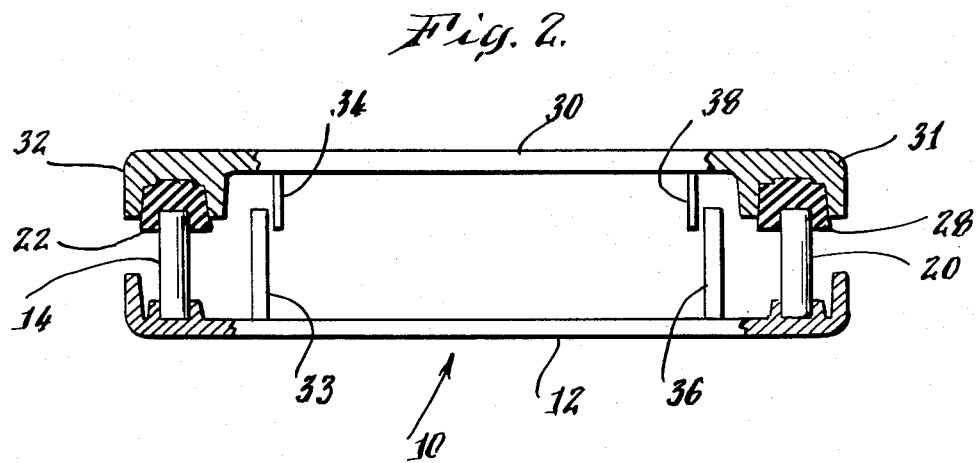
FIG. 2 is a side view of the rectangular weighing scale.

Referring first to FIG. 1 and FIG. 2, there is illustrated a rectangular weighing scale 10 comprised of a base 12, four load cells 14, 16, 18, and 20 with four resilient decoupling members 22, 24, 26, and 28 respectively mounted thereon, and a platform 30 with receiving members 31 and 32 (two others not shown) to receive said decoupling members. Load cells 14, 16, 18, and 20 can be of any typical construction as is known in the art, and they are rigidly mounted on base 12 near the corners of the rectangular base. While base 12 and platform 30 may be rigid structures, in the shown preferred embodiment, the base 12 and platform 30 are cast rib (semi-rigid or semi-flexible) structures, thereby providing extra flexibility and decoupling beyond that provided by the load decoupling members. This added decoupling and flexibility is not essential to the practice of the invention and those skilled in the art will appreciate that the base and platform structures may be constructed in any of numerous well known ways. It will also be seen that mechanical stop couples 33 and 34, and 36 and 38 are provided, and extend from base 12 and platform 30 to prevent damage to the load cells in the case of non-vertical force overloading.

With the foregoing base, load cell, decoupling member, and platform arrangement, if a weight is placed on the platform 30, it will be distributed and measured by the four load cells 14, 16, 18, and 20. Referring to FIG. 3, there is shown a conventional summation amplifier 38 for electrically adding the output signals from the load cells. The ouput 40 from the summation amplifier is proportional to the weight placed on the platform.

Referring now to FIG. 4, there is illustrated one of the load cells 14 and its associated resilient decoupling member 22. The decoupling member 22 is shaped as a severely truncated, tapering, solid cylinder shown as main body 50, with a concentric cylindrical recess 52 and a concentric circular extrusion 54. The recess 52 is arranged to receive said load cell 14 in such a manner that the decoupling member 22 may be said to circumscribe the top end of said load cell. While it is preferable that the load cell fit snugly in the recess of the decoupling member, a 1/16 or even ⅛ inch excess might be tolerable depending on the acceptable error tolerance that is desired for the weighing scale.

The circular extrusion 54 serves as a positioning pad to properly position the platform 30 over the load cells and over the base. To accomplish this function, extrusion 54 engages a receiving member of the platform such that the receiving member may be said to circumscribe the extrusion. Thus, the excess space between the receiving member and the extrusion is preferably kept to less than 1/64 of an inch. Additionally, it should be noted that the platform receiving members, as seen in FIG. 2, preferably are arranged to circumscribe not only extrusion 54, but at least part of the main body 50 of the solid truncated cylinder, for reasons discussed hereinafter.

According to the invention, the decoupling members must be resilient. While any resilient material may be used, it has been found that compression molded silicone of Durometer 50 is especially suited for the purposes of the invention. The resilient decoupling member has a slightly tapered main body 50, and a slightly tapered extrusion 54 as shown in FIG. 5. This tapering is due to the fact that the platform 30 is cast aluminum. When casting a piece having recesses such as are found in receiving members 31 and 32, it is convenient to taper the mold such that it may more easily be removed.

The invention may also be readily understood by describing the physical response of the resilient decoupling member during a weighing procedure. A force F, as seen in FIG. 4, may be seen to have a vertical element $F_v$ and a horizontal element $F_h$. The horizontal element for purposes of this application will be termed as a "non-vertical" force. A vertical force $F_v$ on a platform 30 will be transferred through the resilient decoupling member and measured by the load cell. In fact, most of the vertical force is transferred through the circular extrusion 54 (centering means). This may be understood by recognizing that although the platform is in contact with both the main body 50 and the extrusion 54, the part of the main body 50 not directly over the load cell will resiliently deform leaving the force centered on that part of the decoupling member directly over the load cell. As the circular extrusion 54 is concentric with the main body 50 which has a concentric cylindrical recess 52 for receiving the load cell, it is the circular extrusion 54 which undergoes compression and transfers the force $F_v$ to the load cell. It should be appreciated that in the best mode embodiment, the diameter of the extrusion is approximately $\frac{7}{8}$ inch while the diameter of the recess is $\frac{3}{4}$ inch. Thus, the extrusion 54 is the part of the decoupling member that is directly over the load cell, and is therefore primarily responsible for transferring the vertical force.

The non-vertical force $F_h$ is decoupled by the decoupling member in the following manner. A non-vertical force tends to push platform 30 in a horizontal direction. As the receiving members of the platform partially circumscribe the main body 50 of the resilient decoupling members as well as the circular protrusion, the main body and circular protrusion deform in a horizontal direction and do not transfer the non-vertical force to the load cell. As the main body is approximately $\frac{1}{2}$ inch high with a diameter of approximately 1 and $\frac{1}{2}$ inches (interrupted by recess 52 which is approximately $\frac{3}{4}$ inch in diameter and $\frac{1}{4}$ inch in depth), while the protrusion is only approximately 1/16 inch high, it is the main body which absorbs most of the non-vertical force. In fact, the resilient decoupling member can deform on the order of more than $\frac{1}{8}$ inch before mechanical stops 33 and 34, or 36 and 38 are required to prevent damage. Thus, when a transient non-vertical force $F_h$ is applied, platform 30 shifts in its alignment with base 12, as the resilient decoupling members resiliently deform to absorb the load. When this force is no longer present, the protrusion 54 acts as a positioning pad, and in conjunction with the receiving member of the platform causes the platform to realign with the base. Additionally, the protrusion 54 provides shock absorption of vertical forces, although this is not essential to the invention.

Thus, it will be apparent that an effective resilient decoupling member has been described. The resilient decoupling member is effective in transmitting vertical forces while decoupling the platform and the load cell from non-vertical forces. It should be appreciated that the described resilient decoupling member introduces much less than 1/10 percent error in the accuracy of the weighing scale. It will also be appreciated that such accurate decoupling is accomplished with a simple and low cost resilient decoupling member.

While the invention has been described with reference to the preferred embodiment, it is not intended to be limited thereby, and those skilled in the art will appreciate that many variations and permutations may be made without deviating from the scope of the invention. Thus, while a scale having a rectangular platform and four load cells has been described, those skilled in the art will recognize that only one load cell may be required in certain circumstances, and two or three in other circumstances, and that the shape of the platform is a matter of choice and convenience. Additionally, while the load cell has been discussed with the assumption that it is cylindrical in shape, and thus the resilient decoupling member is likewise cylindrical with a cylindrical recess, it will be appreciated that other shapes may be used in accord with the invention. It is of primary import only that the resilient decoupling member circumscribe part of the load cell and that the receiving member of the platform receive the resilient decoupling member. In fact, those skilled in the art will appreciate that the protrusion 54 on the resilient decoupling member is not required to practice the invention, as a flat top surface (or in fact any other surface) on the resilient member wil be effective in transmitting vertical forces and decoupling non-vertical forces if the platform receiving member is properly shaped.

It will become evident to those skilled in the art that there exist even other variations and permutations which are within the spirit and scope of the invention as described in the specification and set forth in the appended claims.

I claim:

1. A weighing scale comprising:
   a platform having one or more receiving members arranged to receive one or more decoupling members;
   a base;
   one or more load cells attached to said base; and
   one or more resilient decoupling members wherein each of said one or more decoupling members both circumscribes the top end of said load cells and engages one of said receiving members of said platform such that said receiving member circumscribes at least part of said decoupling member, such that vertical forces applied to said platform are measured by said one or more load cells while non-vertical forces are decoupled.

2. A weighing scale according to claim 1 wherein:
   said one or more receiving members of said platform comprise at least three receiving members;

said one or more load cells comprise at least three load cells; and said one or more decoupling members comprise at least three decoupling members.

3. A weighing scale according to claim 1 wherein:
said one or more decoupling members are comprised of compression molded silicone.

4. A weighing scale according to claim 1 wherein:
said one or more receiving members of said platform comprise four members;
said one or more load cells comprise four load cells; and
said one or more decoupling members comprise four decoupling members.

5. A weighing scale according to claim 4 wherein:
said resilient decoupling members each comprise a severely truncated solid cylinder with a recess arranged to receive one of said load cells such that said decoupling member circumscribes the top end of said load cell.

6. A weighing scale according to claim 5 wherein:
said severely truncated solid cylinder is lightly tapered upwardly.

7. A weighing scale according to claim 6 wherein:
said platform and said base are cast rib structures.

8. A weighing scale according to claim 5 wherein:
said load cells are generally cylindrical; and
said recess in said resilient decoupling member is generally circular.

9. A weighing scale according to claim 8 wherein:
each of said resilient decoupling members further comprises a circular extrusion concentrically located on top of said solid cylinder; and
each of said platform receiving members is arranged to circumscribe at least said circular extrusion and at least part of said sylinder of said resilient decoupling member.

10. A weighing scale according to claim 8 wherein:
said generally circular recess in said resilient decoupling member is concentrically located in said resilient decoupling member.

11. A weighing scale according to claim 10 wherein:
each of said resilient decoupling members further comprises a circular extrusion concentrically located on top of said solid cylinder; and
each of said platform receivinc members is arranged to circumscribe at least said circular extrusion and at least part of said cylinder of said resilient decoupling member.

12. A weighing scale according to claim 11 wherein said circular extrusion of said resilient member acts as a positioning pad to align said platform with said base.

13. A weighing scale according to claim 12 wherein:
said severely truncated solid cylinder is slightly tapered upwardly; and
said circular extrusion is slightly tapered upwardly.

14. A resilient decoupling member for a weighing scale having a platform with a receiving member and a load cell, comprising:
a resilient solid body with a recess on the bottom side for receiving a load cell, said solid body being arranged on its top side for engaging said receiving member of said weighing scale such that said receiving member circumscribes at least part of said solid body.

15. A resilient decoupling member according to claim 14 wherein:
said resilient solid body is of generally a severely truncated cylindrical shape; and
said recess is generally circular and concentric in said solid body such that said decoupling member circumscribes the top of said load cell.

16. A resilient decoupling member according to claim 15 further comprising:
a circular extrusion concentrically located on the top of said solid body wherein said platform of said weighing scale circumscribes at least said circular extrusion.

17. A resilient decoupling member according to claim 16 wherein:
said circular extrusion acts as a positioning pad to properly align said platform over said load cell.

18. A resilient decoupling member according to claim 16 wherein:
said resilient severely truncated solid body is slightly tapered upward; and
said circular extrusion of said resilient solid body is slightly tapered upward.

19. A resilient decoupling member according to claim 18 wherein:
the diameter of said circular extrusion is at least as large as the diameter of said recess.

20. A resilient member according to claim 19 wherein:
said resilient decoupling member introduces less than 0.1% error in the accuracy of said weighing scale.

* * * * *